G. W. GILBERT.
Wheel-Hub.

No. 38,669. Patented May 26, 1863.

Witnesses:

Inventor:

UNITED STATES PATENT OFFICE.

GEORGE W. GILBERT, OF RADNOR, PENNSYLVANIA.

IMPROVEMENT IN CARRIAGE-WHEELS.

Specification forming part of Letters Patent No. 38,669, dated May 26, 1863.

*To all whom it may concern:*

Be it known that I, GEORGE W. GILBERT, of Radnor, Delaware county, Pennsylvania, have invented an Improvement in Carriage-Wheels; and I do hereby declare the following to be a full, clear, and exact description of the same, reference being had to the accompanying drawings, and to the letters of reference marked thereon.

My improvement, which is fully described hereinafter, has for its object the perfectly secure attachment of the spokes to the axle-box of a carriage-wheel, and the ready means of removing and replacing the spokes.

In order to enable others skilled in the art to make and use my invention, I will now proceed to describe its construction and operation.

Figure 1:
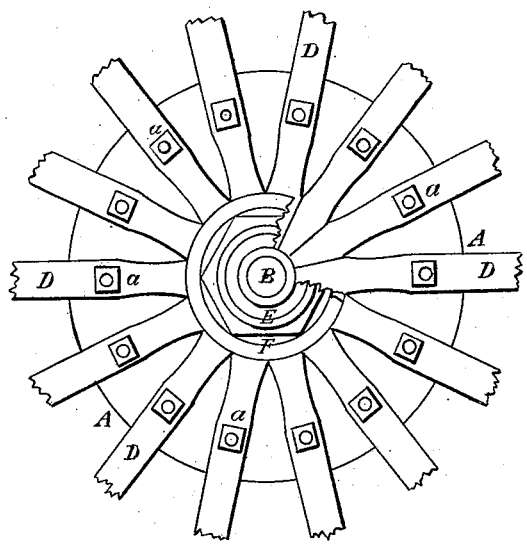
Figure 2:
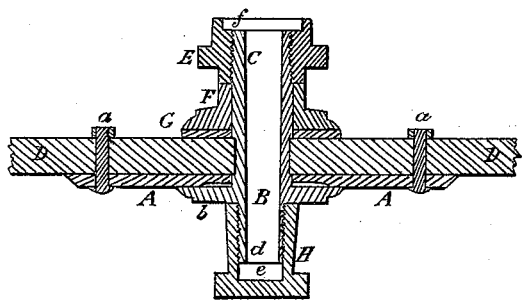

On reference to the accompanying drawings, which form a part of this specification, Figure 1 is a face view of my improved wheel with the rim and portions of the spokes removed, and Fig. 2 is a sectional view.

A is a thin metal plate, which may be solid or, what I consider preferable, cut away at suitable points, so as to render it as light as possible. The spokes D D are made at the end of the tapering form represented in Fig. 1, so that one spoke will fit snugly against the other throughout the series, each spoke being secured by means of a bolt and nut, $a$, to the plate A. On the axle-box B is a flange, $b$, which bears against the plate A, the thread of a screw being cut on the end $c$ of the box for the reception of the nut E, between which and the spokes intervenes a metal washer, F; or there may be another thin washer, G, of leather or other like material, intervening between the washer F and the spokes. Threads of a screw are also cut on the portion $d$ of the box B for the reception of a screw-cap, H. A circular recess, $f$, is formed in the nut E for the reception of the collar on the axle, which is confined to the box by means of a nut or other suitable fastening on the outer end of the journal, which revolves in the box, the nut or other fastening turning in a space, $e$, formed within the cap H.

It will be seen that as the ends of the spokes are fitted against each other and against the box, and as they are firmly confined between the plate A and washer F by means of the nut E, and as each spoke is bolted to the said plate, a perfectly secure attachment of the spokes to the box is effected. It will also be seen that any damaged spokes can be readily removed after withdrawing their bolts $a$, the nut E, and washer F, and that other spokes may be inserted, and this without disturbing the relative position of the remaining spokes or interfering with the integrity of the wheel.

I do not desire to claim any of the within-described parts separately from the whole; but

I claim as my invention and desire to secure by Letters Patent—

The axle-box B, with its flange $p$, nut E, and washer F, in combination with the plate A and the spokes D, fitted to each other and to the box, as described, and secured to the spokes by bolts $a$ $a$, the whole being constructed and arranged substantially as and for the purpose herein set forth.

In testimony whereof I have signed my name to this specification in the presence of two subscribing witnesses.

GEO. W. GILBERT.

Witnesses:
JOHN WHITE,
HENRY HOWSON.